(12) United States Patent
Vranish

(10) Patent No.: US 7,622,907 B2
(45) Date of Patent: Nov. 24, 2009

(54) DEVICE, SYSTEM AND METHOD FOR A SENSING ELECTRICAL CIRCUIT

(75) Inventor: John M. Vranish, Crofton, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 197 days.

(21) Appl. No.: 11/535,872

(22) Filed: Sep. 27, 2006

(65) Prior Publication Data

US 2008/0074098 A1  Mar. 27, 2008

(51) Int. Cl.
*G01R 19/00* (2006.01)
*G01R 27/26* (2006.01)

(52) U.S. Cl. .................... 324/76.11; 324/661
(58) Field of Classification Search .............. 324/76.11, 324/661

See application file for complete search history.

(56) References Cited

U.S. PATENT DOCUMENTS

| | | | | |
|---|---|---|---|---|
| 4,340,865 A | * | 7/1982 | Woodhead | 330/69 |
| 5,373,245 A | * | 12/1994 | Vranish | 324/662 |
| 5,515,001 A | * | 5/1996 | Vranish | 324/123 C |
| 5,521,515 A | * | 5/1996 | Campbell | 324/674 |
| 5,539,292 A | * | 7/1996 | Vranish | 324/686 |
| 5,726,581 A | * | 3/1998 | Vranish | 324/688 |
| 6,847,354 B2 | * | 1/2005 | Vranish | 345/173 |
| 6,922,153 B2 | * | 7/2005 | Pierga et al. | 324/661 |
| 7,076,381 B2 | * | 7/2006 | Gibb et al. | 702/75 |
| 7,288,945 B2 | * | 10/2007 | Martinez et al. | 324/663 |

* cited by examiner

*Primary Examiner*—Timothy J Dole
(74) *Attorney, Agent, or Firm*—Matthew Johnston

(57) ABSTRACT

The invention relates to a driven ground electrical circuit. A driven ground is a current-measuring ground termination to an electrical circuit with the current measured as a vector with amplification. The driven ground module may include an electric potential source $V_S$ driving an electric current through an impedance (load Z) to a driven ground. Voltage from the source $V_S$ excites the minus terminal of an operational amplifier inside the driven ground which, in turn, may react by generating an equal and opposite voltage to drive the net potential to approximately zero (effectively ground). A driven ground may also be a means of passing information via the current passing through one grounded circuit to another electronic circuit as input. It may ground one circuit, amplify the information carried in its current and pass this information on as input to the next circuit.

6 Claims, 18 Drawing Sheets

DEVICE, SYSTEM AND METHOD FOR A SENSING ELECTRICAL CIRCUIT

ORIGIN OF THE INVENTION

The invention described herein was made by an employee of the United States Government, and may be manufactured and used by or for the Government for governmental purposes without the payment of any royalties.

FIELD OF THE INVENTION

The invention disclosed herein generally relates to a current measuring electrical circuit. More particularly, the invention provides a system for utilizing measured parameters to discriminate insulators, such as dielectric objects, from conductors.

BACKGROUND OF THE INVENTION

It has been known to utilize capaciflector/capacitive sensing for robotic collision avoidance and for "virtual feel" robotic assembly and servicing as long as the objects operated on were electrical conductors. Further, capacitive technology has been used for quality control measurement in industry and government, including dielectric glass quality control. Capacitive sensing technology has also been used for precision alignment of components and sub-systems in scientific instruments.

However, sensing insulating materials has been found to be more problematic than sensing electrical conductors. For example, known sensors may be unable to distinguish between an electrical conductor at a distance far away and an insulator at a close range. Also, the known capacitive technology is not able to accurately sense a dielectric film that is over a conductor.

Basic capacitive technologies measuring dielectric materials, such as glass, have several limitations. To gain sufficient electric field strength to pass through the stand-off range to the glass, to penetrate the glass and to return to electrical ground, a transformer may typically be used to amplify the electrode voltage by approximately a factor of 100. Even so, this type of system does not work near the edges of the glass. For example, these systems fail to discriminate between edge losses, alignment errors, and glass anomalies.

Capacitive sensing systems used for precision alignment of components and subsystems in scientific instruments have been successful, but are more than an order of magnitude less precise than embodiments of the present invention that employ a driven ground circuit with capacitive sensing or capaciflector technology.

Inverting amplifiers are not normally used to terminate a load and, usually provide no direct information about the electric current passing through the load. Inverted amplifiers may be used to terminate a load with the virtual ground feature performing that function. However, in this role, the input resistance may be unnecessary and reduces its sensitivity as a ground termination.

Thus, a problem exists in the art in connection with an inability of known sensors to accurately detect insulators. The insulators may be detected in general, however, there continues to be a problem of more precisely identifying and characterizing insulators and their relative permittivity.

Accordingly, it may be desirable to provide an electrical circuit for a sensor system that can accurately detect an insulative material, such as a dielectric. It may also be desirable to provide an electrical circuit for a sensor system which accurately detects and quantifies an insulative material. Further, it would be desirable to provide a sensor system that accurately detects an insulative material utilizing a driven ground electrical circuit that may be applicable to various sensing environments and sensing systems.

SUMMARY OF THE INVENTION

In one embodiment, a sensor system and method accurately detects an insulative material using a driven ground electrical circuit, hereinafter "driven ground", configuration. A driven ground may be a current-measuring ground termination to an electrical circuit with the current measured as a vector with amplification. A driven ground may also be a means of passing information via the current passing through one grounded circuit to another electronic circuit as input. It may ground one circuit, amplify the information carried in its current and pass this information on as input to the next circuit. A driven ground may further be a means of focusing electric flux (capacitor), magnetic flux (inductor), both electric and magnetic flux (radar) and, thereby, providing more accurate location of the ground points nearest the source. Additional features of the invention will be set forth in part in the description which follows, and in part will be obvious from the description, or may be learned by practice of the invention.

In one embodiment of the invention a sensing circuit is disclosed wherein the circuit includes: an electric potential source; an impedance load; and a driven ground comprising a resistor and an operational amplifier. The electric potential source drives a current through the impedance load to the driven ground, and the voltage source exciting a minus terminal of the operational amplifier to reactively generate an equal and opposite voltage driving a net potential to approximately. It is to be understood that both the foregoing general description and the following detailed description are exemplary and explanatory only and are not restrictive of the invention, as claimed.

BRIEF DESCRIPTION OF THE DRAWINGS

The accompanying drawings illustrate embodiments of the invention and together with the description, serve to explain the principles of the invention.

DETAILED DESCRIPTION

Figure 1A:
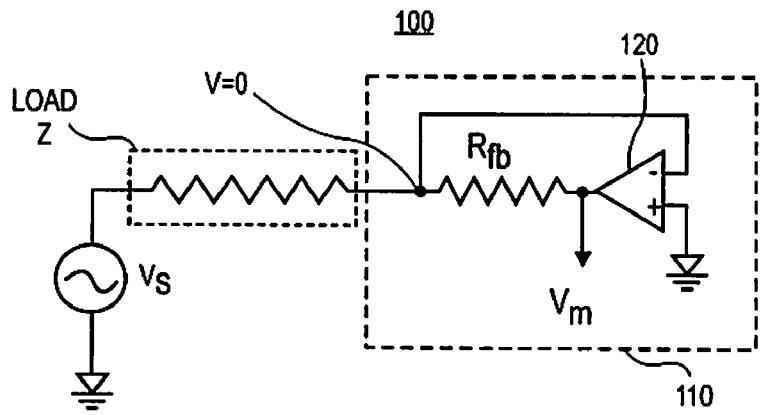
FIG. 1A shows a driven ground module according to an embodiment of the present invention.

Reference will now be made in detail to exemplary embodiments of the invention, which are illustrated in the accompanying drawings. Wherever possible, the same reference numbers will be used throughout the drawings to refer to the same or like parts. For simplicity and illustrative purposes, the principles of the present invention are described by referring mainly to exemplary embodiments thereof. However, one of ordinary skill in the art would readily recognize that the same principles are equally applicable to, and can be implemented in, all types of sensors and sensor systems, and that any variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In one embodiment, a driven ground is electrically equivalent to a natural ground except the ground termination is accomplished in three (3) stages. 1). A virtual ground is physically connected to the electronic circuit to force the potential to ground at its termination point. 2). The action of the current, passing through the virtual ground, excites an amplified inverting voltage source to re-energize the current after it passes through ground potential and to provide an amplified measurement of the current vector passing through the circuit. 3). The current continues on through a selected impedance to natural ground where the circuit is completed. A Driven Ground can be applied to electronic circuits involving capacitors, magnetic circuits and/or electric currents through resistors. The concept can also terminate in combinations of all three (3).

At the outset, the term "driven ground" may be a simple, building block concept, capable of functioning with other building blocks of "natural ground," "driven source," and "driven shield" to form useful, capable electrical circuits and systems of many forms and variations. Each of the terms may be described more fully in the following description and representative applications will be introduced to demonstrate how the concept building blocks may be combined to form and operate in different systems.

The term "amplified driven ground," as used herein, refers to a reconfigurable combination basic concept (driven source, driven ground, natural ground) all based on a common current measuring operational amplifier ("op-amp") configuration, which can be switched from state to state. Driven source and driven ground may both be vector components. A driven source can be utilized as a driven sensor or a driven shield.

The term "single driven source," as used herein, refers to supplying electric flux to each of several driven ground sensors. The term "tri-state," as used herein, refers to driven source, driven ground, and natural ground being electrically reconfigurable tools that can discriminate dielectric from conducting objectives.

In general, a driven ground/driven sensor row over column sensor array configuration, as used herein, may provide electric field proximity pixels. This configuration measures relative surface deformations and/or a pressure/haptic touch force. Embodiments of the present invention may use both the electric field configuration and a method for interpreting the signals. Triangular row and column electrodes, as used herein, may form proximity arrays of rectangular pixels. Selective driven ground row and column scanning in arrays of rectangular pixels, as used herein, may discriminate dielectric from conducting objects.

As illustrated in FIG. 1A, an exemplary embodiment of the present invention relates to a driven ground module 100. The driven ground module 100 may include an electric potential source $V_S$ driving an electric current through an impedance (load Z) to a driven ground 110. Voltage from the source $V_S$ excites the minus terminal of an operational amplifier 120 inside the driven ground 110 which, in turn, may react by generating an equal and opposite voltage to drive the net potential to approximately (effectively ground).

Figure 1B:
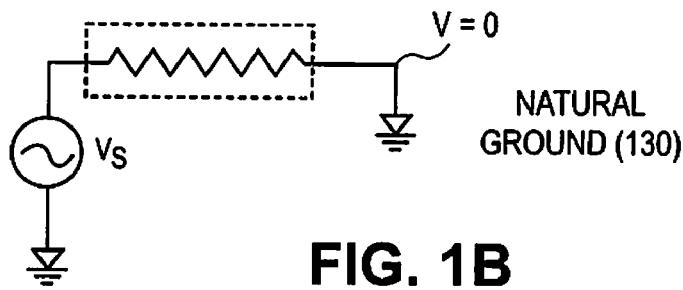
FIG. 1B shows a natural ground module according to an embodiment of the present invention.

FIG. 1B illustrates a similar arrangement to FIG. 1A, except that a natural electrical ground 130 may be shown rather than a driven ground. Driven ground 110 and natural ground 130 may affect the source $V_S$, current, and impedance Z in the same manner, but the driven ground 110 may measure the current (amplitude, phase, and frequency) that passes through the grounded terminal whereas the natural ground does not. Driven ground 110 may be a vector quantity and natural ground 130 may be a scalar quantity.

Figure 1C:
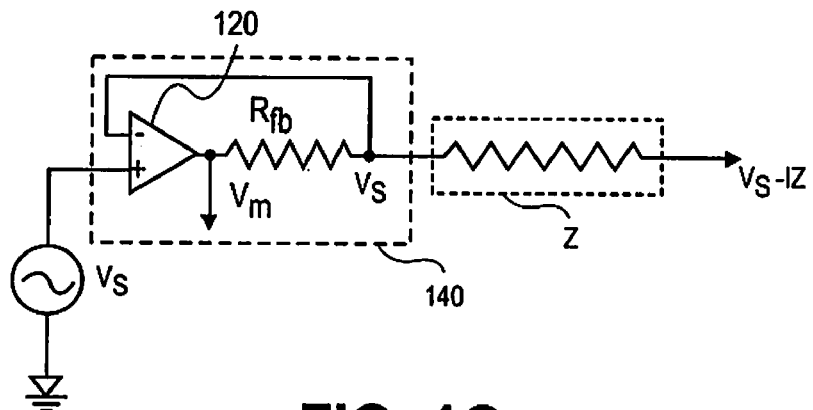
FIG. 1C shows a source ground module according to an embodiment of the present invention.

FIG. 1C illustrates a driven source 140, which may use a physical construction similar to driven ground 110 of FIG. 1A, to provide a voltage source vector, which may enable measuring source voltage amplitude, phase, and frequency. The significance of the similarity in construction between driven ground 110 and driven source 140 may enable various illustrated configurations to be switched from form-to-form and function-to-function in real time.

Figure 2A:
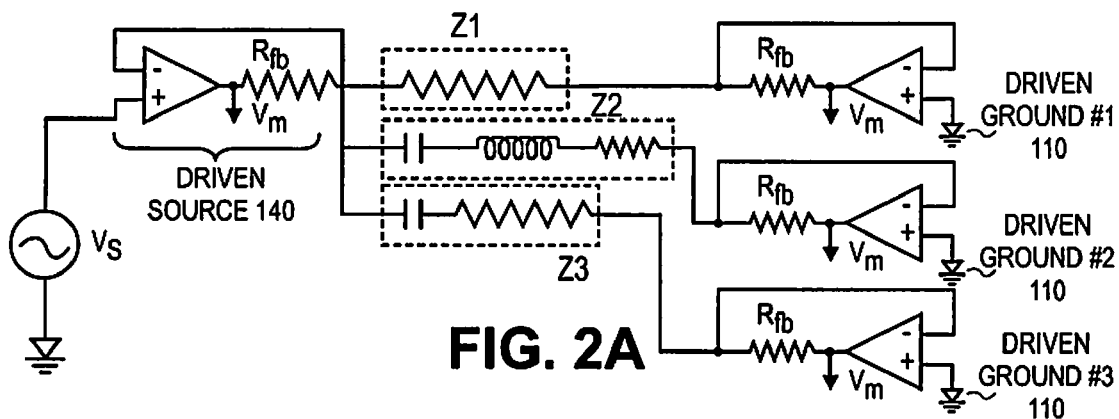
FIG. 2A shows a circuitry directed to a driven ground array according to an embodiment of the present invention.

However, for purposes of explaining some of the principles of the present invention, the difference in capabilities between the driven ground 110 and natural ground 130 will now be illustrated in connection with FIGS. 2A and 2B. In FIG. 2A, a single driven source 140 provides a voltage to three parallel loads Z1, Z2, and Z3, each of which may be different from the others. The driven ground 110 attached to load Z1 measures the current through that load to include its amplitude, frequency and phase. The driven ground 110 attached to Z2 may measure the current through that load (again amplitude, frequency, and phase). The amplitude, frequency and phase information is likewise, provided by the driven ground 110 attached to Z3. Using driven ground terminations may provide a clear measure of the current passing through each load.

Figure 2B:
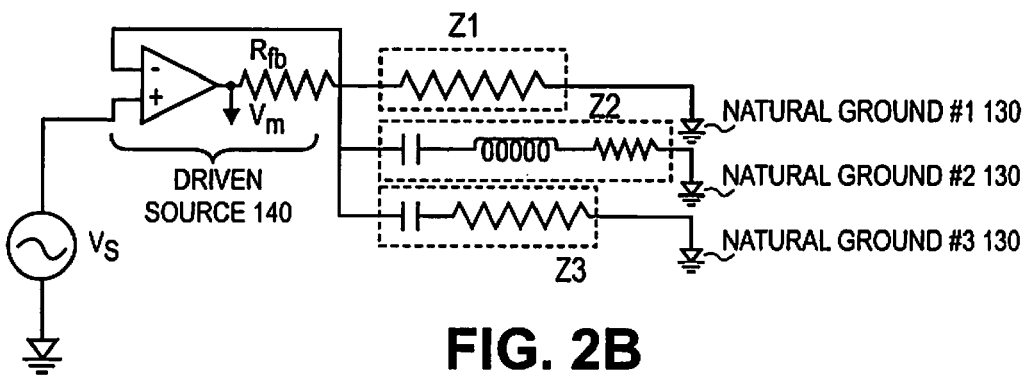
FIG. 2B shows a circuitry directed to a natural ground array according to an embodiment of the present invention.

In contrast, as shown in FIG. 2B, with the use of natural ground 130, the individual load information is not measured. In both of FIGS. 2A and 2B, driven sources 140 may be used so that the amplitude, phase, and frequency are all known for the total current passing through the aggregate of the parallel loads Z1, Z2, Z3.

Figure 3:
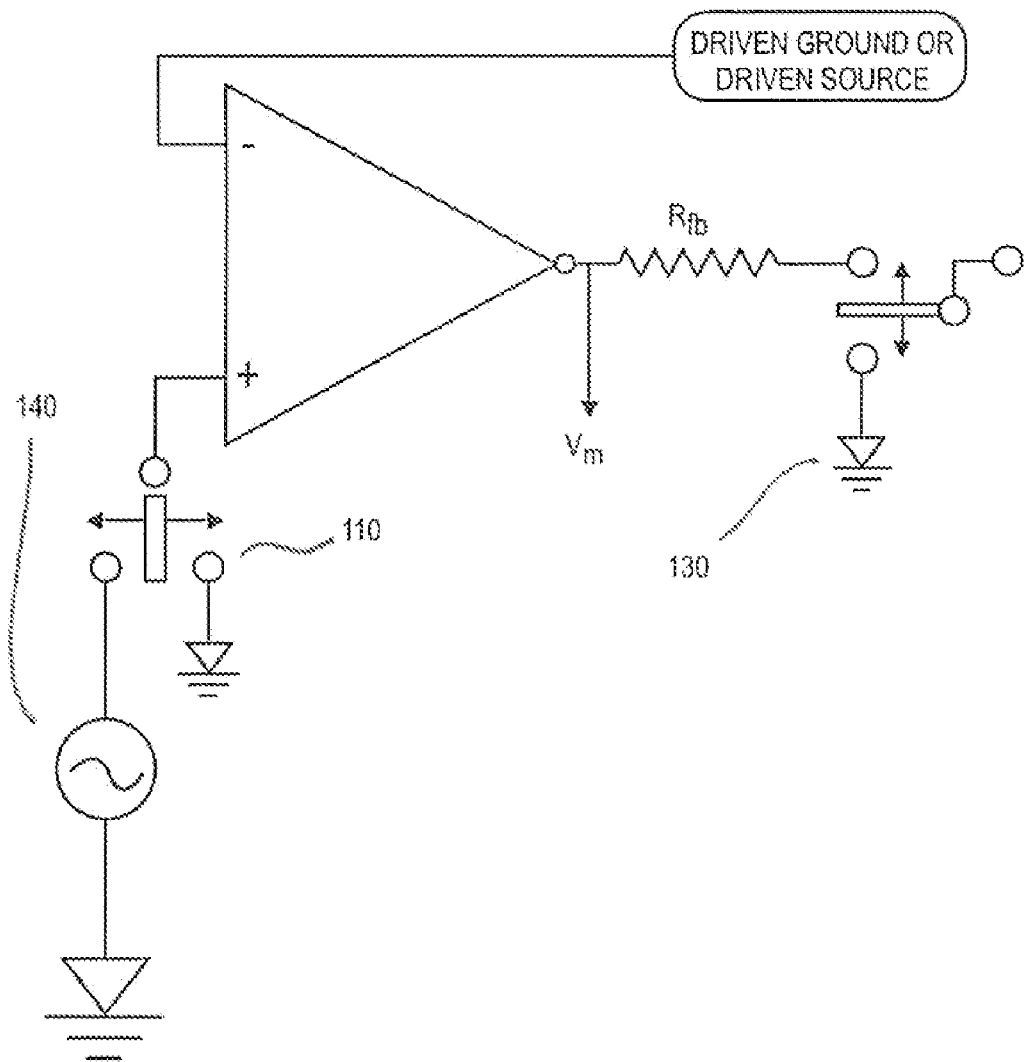
FIG. 3 shows a diagram of a real time sensor according to an embodiment of the present invention.

Referring now to FIG. 3, a real time sensor configuration is shown. In particular, switching between driven ground 110, driven source 140, and natural ground 130 is shown.

As shown in FIG. 3, when the configuration has the plus (+) terminal of the operational amplifier 120 switched to ground and an output load line switched to an operational amplifier output terminal, a driven source configuration 140 results. When the output load line is switched to ground, a natural ground-like configuration 130 results (regardless of the switch position of the operational amplifier plus terminal). The performance of the driven ground configuration is explained in the following by examining the performance of driven sources with reference to FIG. 4A.

Figure 4A:
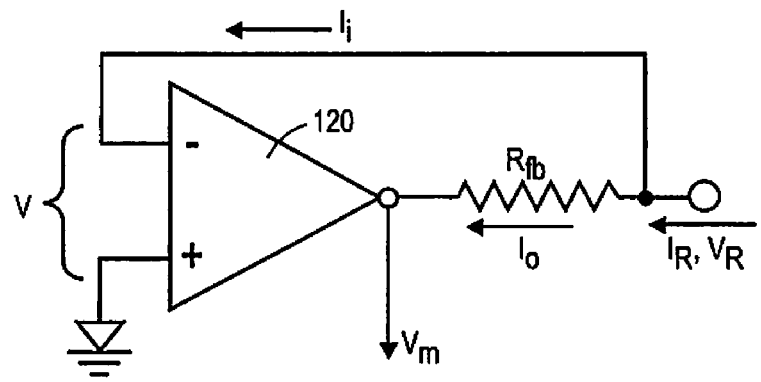
FIG. 4A shows a driven ground operational amplifier circuit according to an embodiment of the present invention.

Driven ground analysis begins by examining the equivalent circuit as shown in FIG. 4A and the following equations are applicable.

$$I_R = I_O + I_I \quad (1)$$

$$I_I R_I = \Delta V = g_M \Delta V - I_O(R_O + R_{FB}) \quad (2)$$

$$I_I = \frac{g_M \Delta V}{R_I} - \frac{I_O(R_O + R_{FB})}{R_I} \quad (3)$$

$$I_I = g_M I_I - \frac{I_O(R_O + R_{FB})}{R_I} \quad (4)$$

$$I_I(g_M - 1) = \frac{I_O(R_O + R_{FB})}{R_I} \quad (5)$$

$$I_I \approx \frac{I_O R_{FB}}{g_M R_I} \quad (6)$$

$$I_O \gg I_I; I_O \approx I_R \quad (7)$$

$$\Delta V = \frac{I_O R_{FB}}{g_M} \quad (8)$$

$$V_M = -g_M \Delta V + I_O R_O \approx -g_M \Delta V \quad (9)$$

$$V_M \approx -I_O R_{FB} \approx -I_R R_{FB} \quad (10)$$

For purposes of explanation, it is assumed:
$g_M = 150,000$ (DC open loop gain)
$V_M = 0.1$ volts
$R_{FB} = 10E3 \Omega$ From equation (10), and estimated values from directly above:

$$I_O = I_R = \frac{0.1}{10E3} = 10E - 6 \text{ amps} \quad (11)$$

From equation (9) and estimated value from directly above:

$$V_M = -g_M \Delta V$$

$$\frac{0.1}{g_M} = -\Delta V = -6.7E - 7 \text{ volts} \quad (12)$$

Even if $g_M$ drops off by a factor of 10 (e.g., at high frequency and under large electrical impedance load), $\Delta V$ still is only 6.7 E-6 volts, and essentially ground. Since 7 microvolts is an insignificant amount in this situation, and essentially zero, driven ground 110 is indistinguishable from natural ground 130 in performance.

Figure 4B:
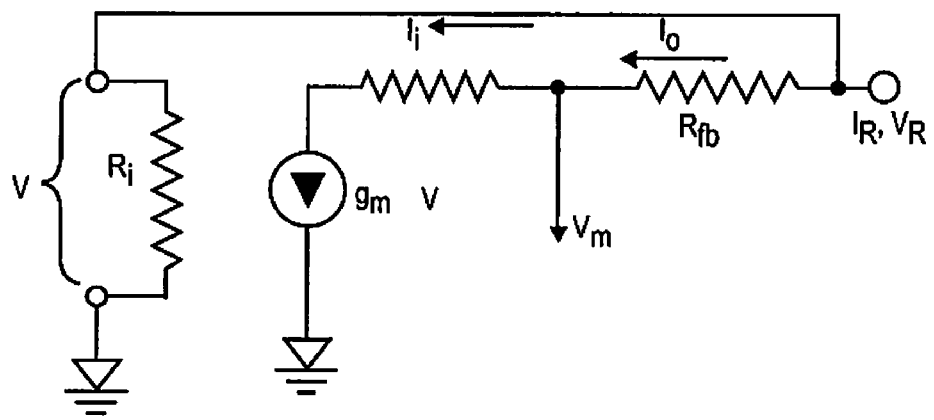
FIG. 4B shows a voltage droop introduced in driven source according to an embodiment of the present invention.

Referring now to FIG. 4B, voltage droop introduced in driven source 140 is now explained by the following equations.

$$(V - (V_M - I_O R_{FB}))g_M = (V_M - I_O R_{FB})$$

$$(V - (V_M - I_O R_{FB}))g_M = \Delta V$$

$$(V - (V_M - I_O R_{FB}))g_M = \frac{(V_M - I_O R_{FB})}{g_M}$$

$$V = (V_M - I_O R_{FB})\left(\frac{g_M + 1}{g_M}\right)$$

$$\frac{V}{(V_M - I_O R_{FB})} = 1 + \frac{1}{g_M} = 1 + \frac{1}{150,000}$$

This produces a voltage droop on the order of:

$$\frac{1}{150,000} = 6.67E - 6 \text{ Volts}$$

(which may be considered insignificant).

Figure 5A:
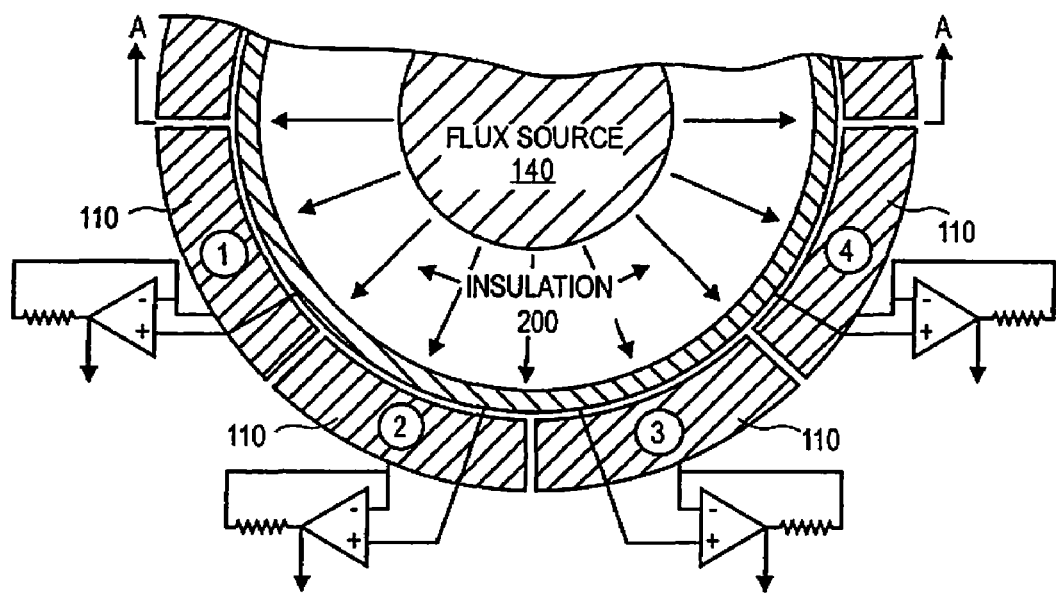
FIG. 5A shows a schematic view of a single driven source and an array of driven ground according to an embodiment of the present invention.

The following are representative applications based on the above described concepts of driven ground, driven source, and natural ground. These examples include a single source and driven ground array as shown in FIG. 5A. One skilled in the art will also recognize that embodiments of the present invention may employ driven source array and driven ground array pixels and may be applied to a real time switching reconfiguration sensor system.

Figure 5B:
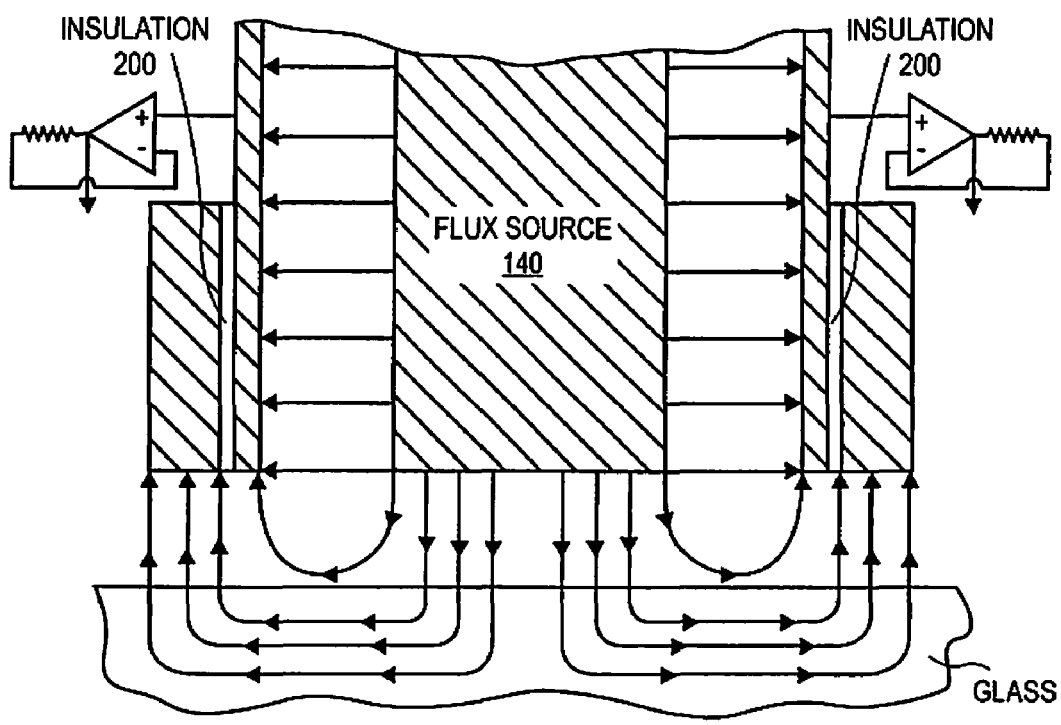
FIG. 5B shows a sectional view taken along line A-A of FIG. 5A.

Referring to FIG. 5A, a bottom schematic view of a single driven source and an array of driven grounds is illustrated, and FIG. 5B is a side sectional view taken along line A-A of FIG. 5A. In these figures, a single driven source (such as a flux source) 140 is coupled to an array of driven ground sensors 110 equally spaced around a perimeter of the driven source 140. A natural ground shielding element 200 (such as insulation) may be inserted between the driven source 140 and the array of driven ground sensor 110 to improve signal to noise.

A portion of the electric flux couples through the air to the driven ground array 110. When a sensor probe (not shown) comes to near proximity of the insulator 200 (with dielectric relative permittivity>1, such as on the order of 4 or 5), the presence of the dielectric (glass in this instance) causes the electric flux going to the driven ground sensors 110 to increase. The increase in flux indicates a measure of electric field intensity and displacement current and is measured by each of the driven grounds 110. These measurements, in turn, indicate distance from the flux source, driven source 140, to the glass surface and the distance from the glass surface to the driven ground being measured. The driven ground configuration enables the flux measurements at each of the driven grounds to be made with great sensitivity. For example, open loop gains can be typically about 140,000 to 1, which enables $70 \times 10^{-6}$ volt signal discrimination. Therefore, by comparing the readings between the sensors of the array, the range, tilt, edges, and irregularities in the glass surface can be measured and discriminated.

Referring now to FIGS. 6, 7, and 8A-B, an example of a sensor that can reconfigure itself in real time is illustrated. In particular, the exemplary sensor may be in the form of a hand tool, such as a wrench 220, in proximity to a workpiece 228.

Figure 6:
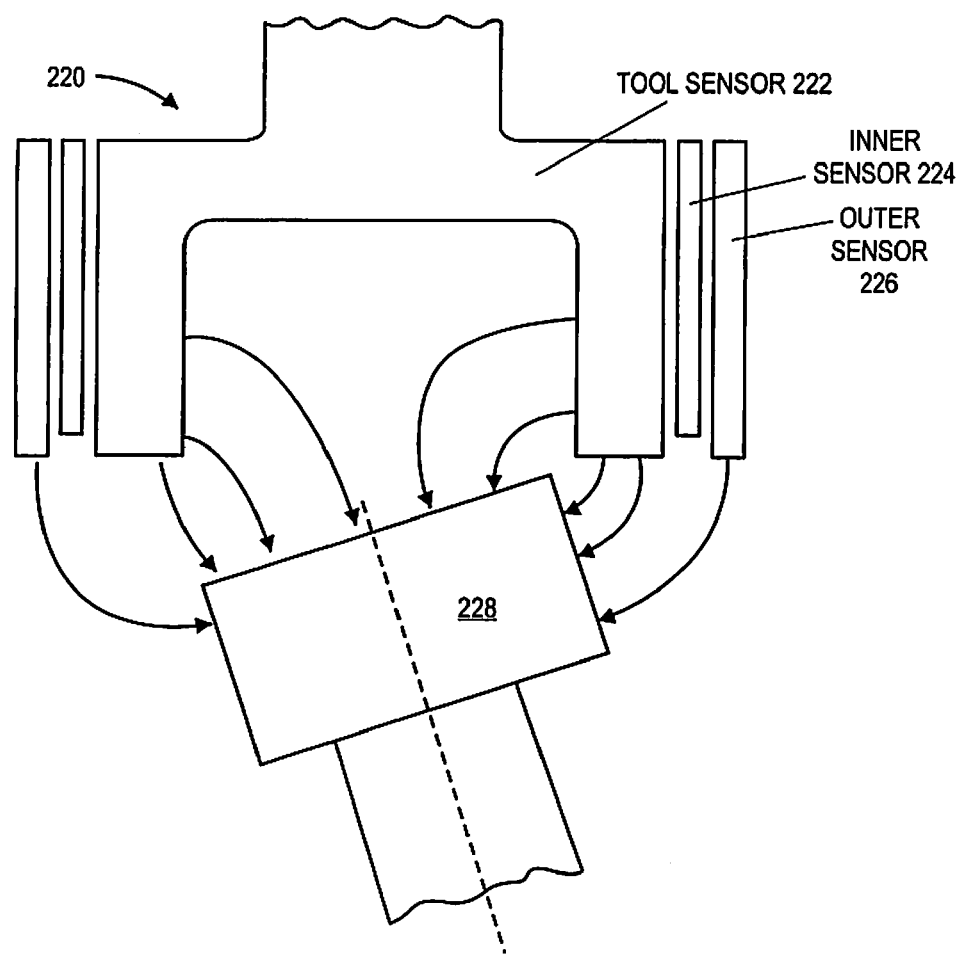
FIG. 6 shows a schematic illustration of a wrench configuration incorporating components of the present invention.

FIG. 6 illustrates the wrench 220 configured such that each of three sensors therein may be configured to be a driven sensor. This configuration is used in applications involving electrical conductors. More specifically, the wrench 220 includes a tool sensor 222, an inner sensor 224, and an outer sensor 226. Any of the three sensors can switch between any three states in real time. The three sates include driven sensor, driven ground 110, and natural ground 130.

Figure 7:
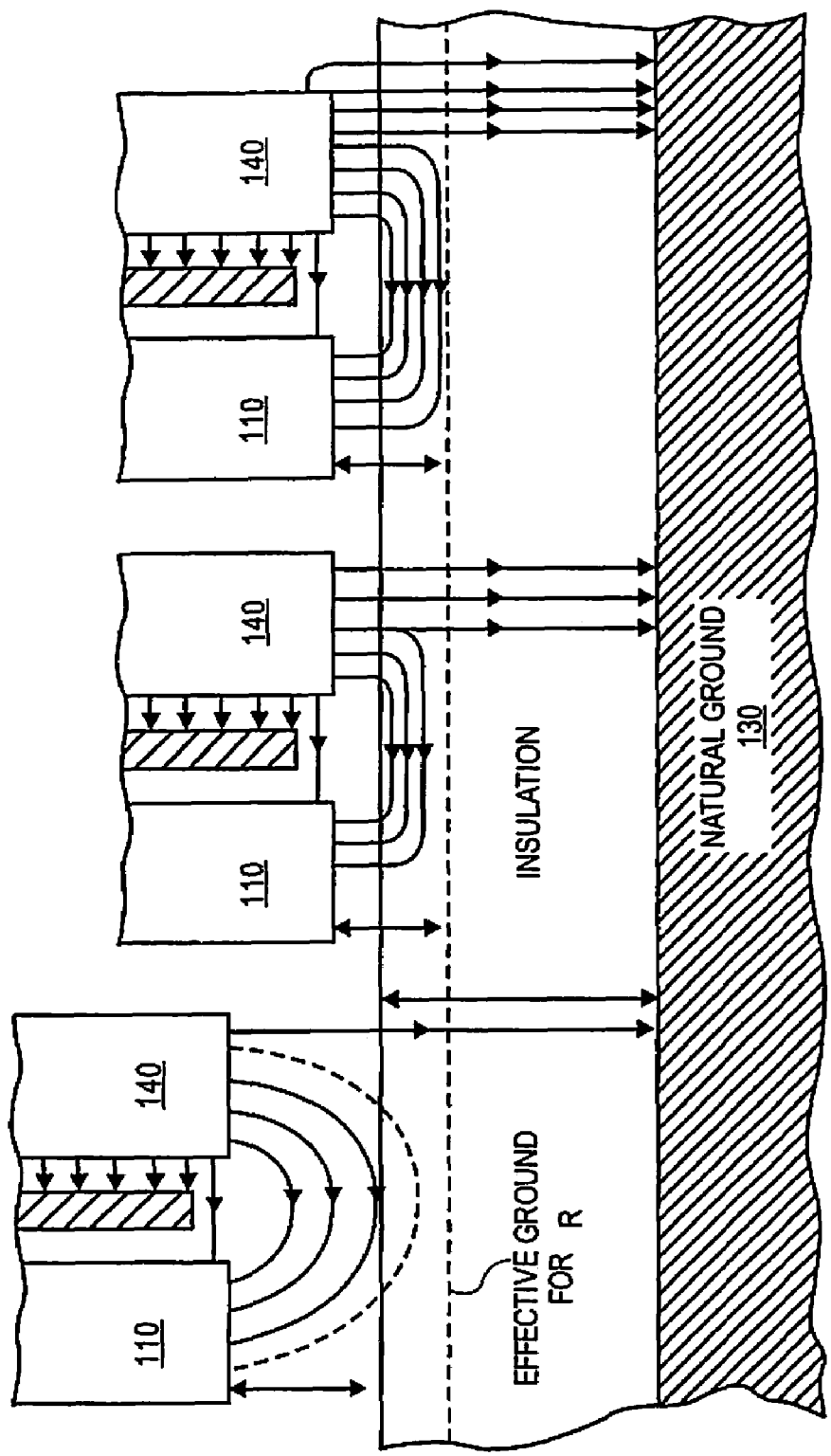
FIG. 7 shows a sensor configuration utilized in an embodiment of the present invention.
Figure 8A:
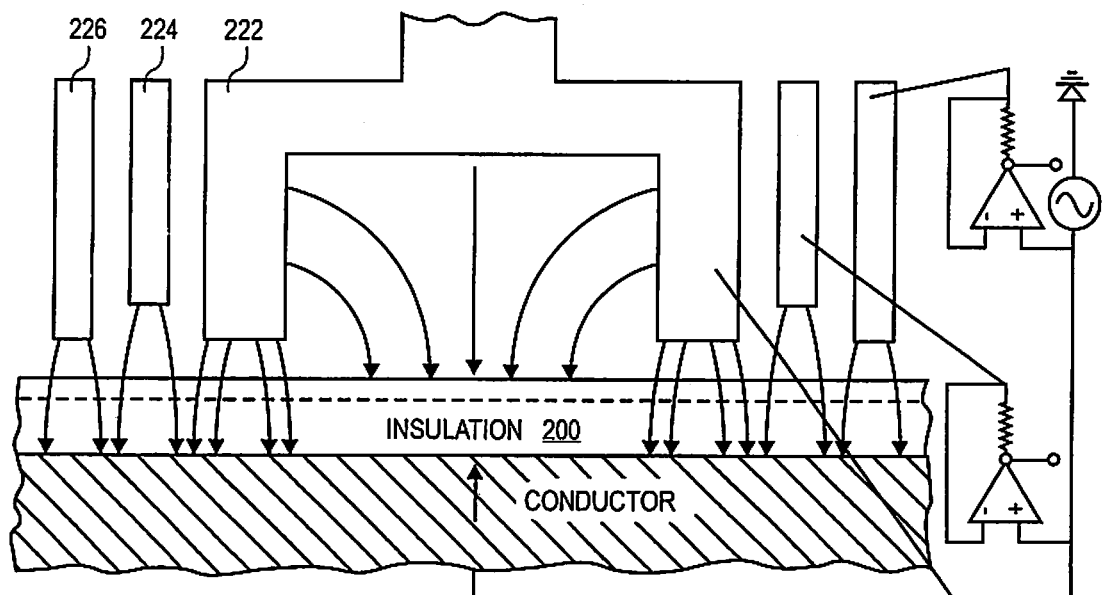
FIGS. 8A and 8B show more detail in changing states to search out dielectrics in the presence of conductors.
Figure 8B:
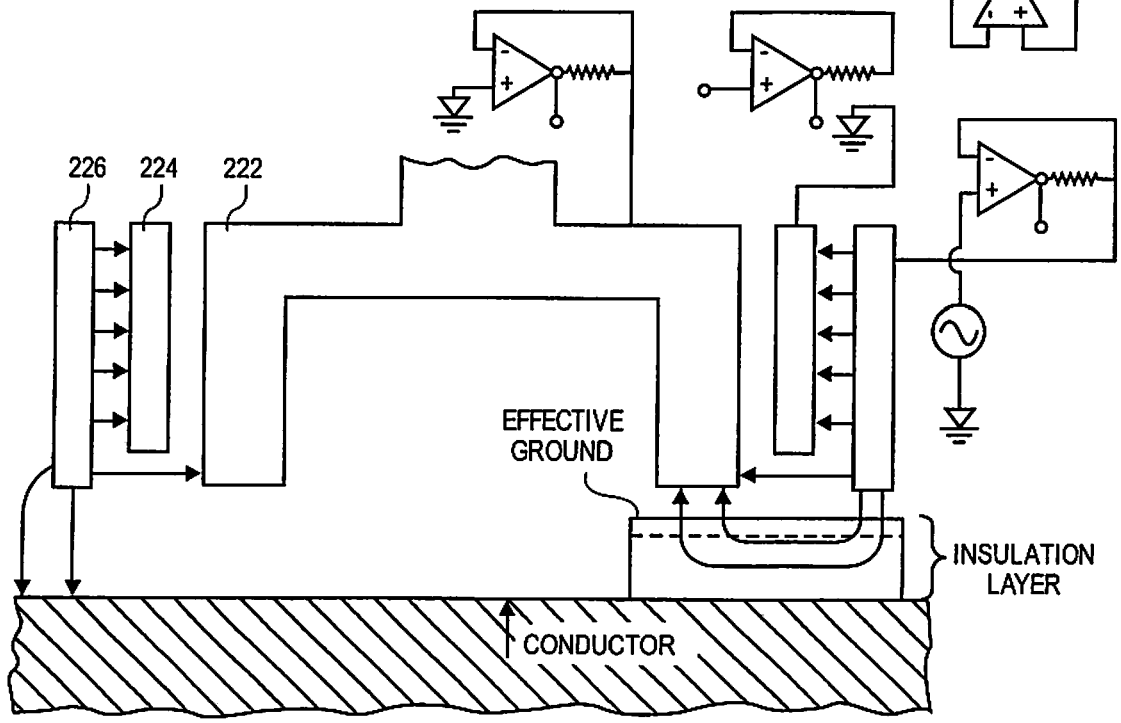

FIG. 7 illustrates the sensor configuration where an inner electrode (tool sensor 222) may be a driven source, a middle electrode (inner sensor 224) may be a natural ground and the outer electrode 226 is a driven ground. This configuration may typically be used when the sensor is searching for the presence of an insulator/dielectric or an insulator/dielectric film over a conductor. FIG. 7 also illustrates how this configuration can detect changes in electric fields as range changes. FIGS. 8A and 8B show more detail with respect to the changing states to search out dielectrics in the presence of conductors.

A general procedure for using the reconfigurable sensor in connection with FIGS. 6, 7, 8A, and 8B may be as follows. A configuration of all sensors in a driven source 140 mode will be used to measure range. A reconfiguration to a driven ground 110 configuration may look for imminent contact with an insulator. The tool 220 may be wiggled up and down slightly in a predetermined range to verify a safety margin. An indicator will blink in real time between all driven source and driven ground configurations as the tool moves to the region of precision assembly/disassembly.

The tool may then move slowly to capture and seat on the workpiece 228, such as a fastener (bolt), using non-contact "virtual feel". A real-time blinking between sensor states occurs until it is established that only electrical conductors are present (no insulators). Once this is established, one may use a driven sensor configuration for virtual feel precision, and thus non-contact seating.

Now, the procedure utilizing driven ground 110 operations will be more closely examined in the presence of insulators/dielectrics. First note that when the path length from the driven sensor through the air gap, through insulator path and back across the air gap to driven ground 110 is less than or equal to the path length from driven sensor through the air gap and through the insulator layer thickness to natural ground 130, the driven ground 110 may read a current increase. This can be shown by the following equations:

$$d + \frac{\Delta L}{\varepsilon_R} + d \le d + \frac{t}{\varepsilon_R} \qquad (13)$$

Where:
d=Air gap width
ΔL=spacing between "driven sensor" and "driven ground"
$\in_R$=Relative dielectric constant of insulator
t=Thickness of insulator
Simplifying equation (13) results in:

$$\frac{\Delta L}{g_R} + d \le \frac{t}{\varepsilon_R} \qquad (14)$$

In some instances, it can be assumed:

$$\Delta L = \frac{t}{2}, d = \frac{t}{2\varepsilon_R}$$

And, substituting these values into equation (13) above, the result is:

$$\frac{t}{2\varepsilon_R} + \frac{t}{2\varepsilon_R} \le \frac{t}{2\varepsilon_R} \qquad (15)$$

Representative values for equation (15) would estimate $\in_R$=4 and a separation between driven source and driven ground of 0.030 in. (t/2). Hence, it can be easy to detect the presence of a dielectric film 0.060 inches thick with a relative dielectric constant of 4. In most cases this will be sufficient. For measuring even thinner insulator films, the separation between driven sensor and driven ground 110 can be further reduced. The real error in measuring the contact surface is $$\frac{t}{\varepsilon_R} n = .060/4 \text{ inches} = 0.015$$

inches which can be compensated by moving slowly to touch contact and force/torque haptic sensing or by maintaining a ¼ inch safe separation.

Figure 9A:
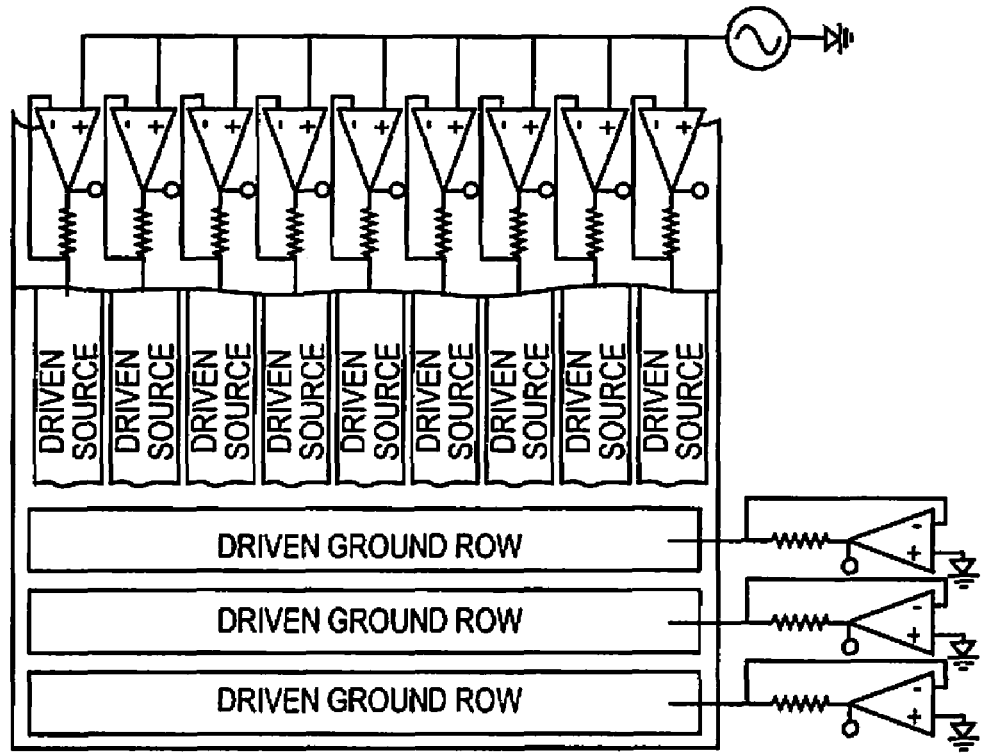
FIGS. 9A and 9B show an example of a deformation camera application in connection with the concepts of the present invention.
Figure 9B:
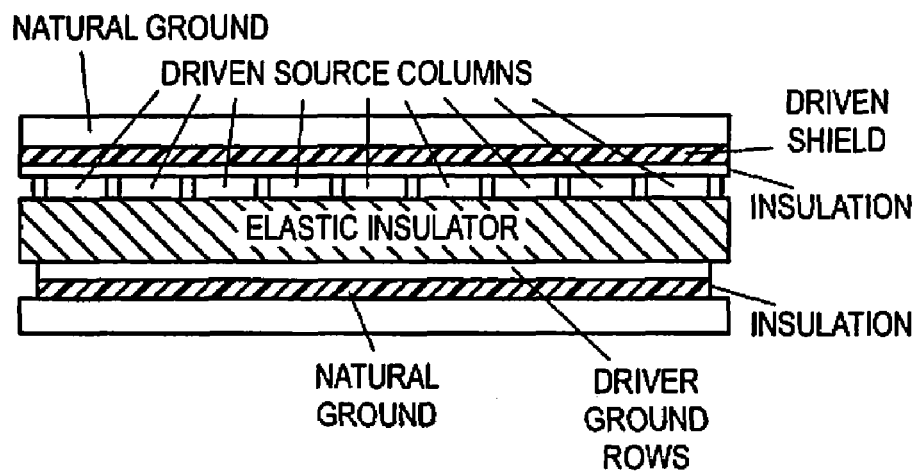

Referring now to FIG. 9, an example of a deformation camera application will now be examined. The deformation camera may come in two basic forms, one which measures displacement and the haptic forces associated with the displacement and one that measures displacement only. Both will be discussed.

The deformation camera (haptic version shown in FIG. 9), may include a compressed, flexible multi-layer sheet of the following layers: natural ground layer (A); thin insulation layer (B); a driven shield layer (C): a thin insulation layer (D); driven source columns (E); a separation layer (F); a layer containing multiple driven ground rows (G); a thin insulation layer (H); and a natural ground layer (I).

A deformation camera operation could proceed as follows. When an object makes contact with either the upper or lower surfaces of the deformation camera, that surface may deform in response and a portion displaces toward the opposite surface. This, in turn, may cause the elastic insulation layer to compress and bring portions of the driven source columns close to portions of the driven ground rows directly below. This in turn, may increase displacement current passing between the driven source columns and the driven ground rows. The displacement current and the deformation may be used to determine the extent and shape of the deformation in a three dimensional manner. The elastic constant of the elastic insulation layer may be used with the deformation extent and shape to determine the force and pressure being exerted by the object. In applications measuring deformation only without generating haptic forces, the elastic insulation layer can be made to be very soft or eliminated all together, leaving an open separation space.

Figure 10A:
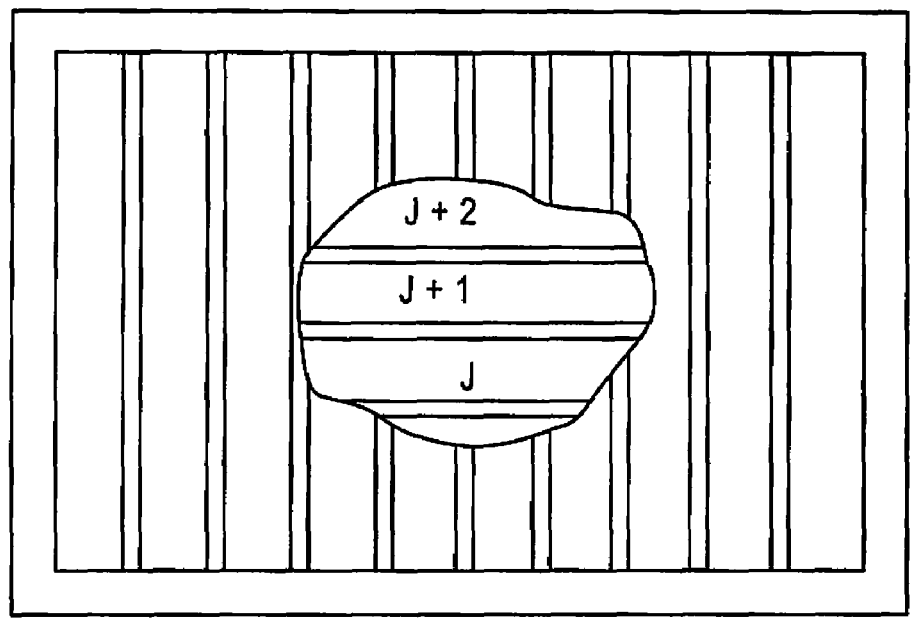
FIGS. 10A through 10C relate to deformation camera signal processing in accordance with embodiments of the present invention.
Figure 10B:
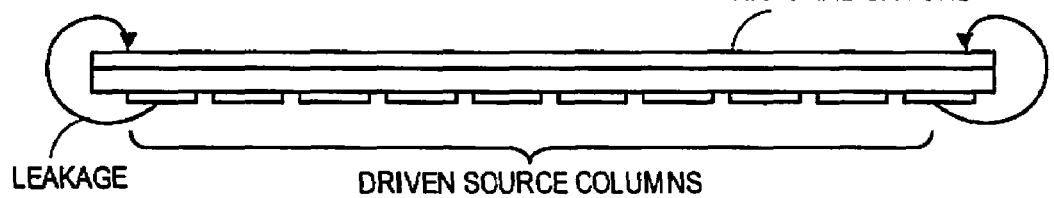
Figure 10C:
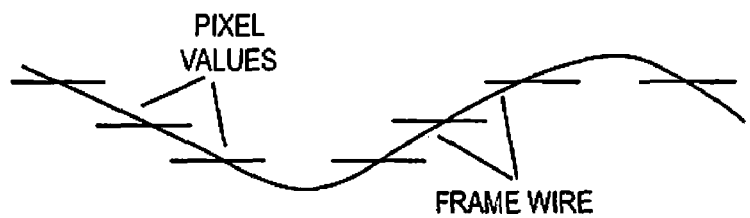

Deformation camera signal processing will now be explained with reference to FIGS. 10A through 10C. Displacement current may be measured for each row and for each column and then related to measure their mutually simultaneous values. The measurements and the methods to time synchronize or time-adjust the measurements can be accomplished in any of several common signal processing methods and multiplexing known to those skilled in the art.

Displacement current passing between columns and rows may be apportioned on a pixel by pixel basis. The first estimate of this apportionment may be accomplished by the following procedure:

Displacement current may be measured for each of the columns and for each of the rows. As shown in FIG. 10B, displacement current leakage losses are estimated by the following equation:

$$\sum_{I=1}^{M} X_I = \sum_{J=1}^{N} J_Y - \text{losses}$$

The losses are estimated to occur mainly (and presumably equally) between driven source columns $Y_I$ and $Y_J$ and the current readings of these two columns may be adjusted accordingly.

A pixel on each driven ground row $X_I$ is calculated by the equation $$X_{IJ} = \frac{X_I}{\sum_{J=1}^{N} Y_J} Y_J$$

Where the corrected values of $Y_I$ and $Y_J$ may be used

The process, described directly above, may be repeated for each of the J driven source columns.

The next driven ground row $X_{J-1}$ will be apportioned into pixel values by the same process used for $X_I$. In this manner, the entire driven ground set of rows can be apportioned into a mosaic of individual pixels.

The entire driven source set of columns can be apportioned into a mosaic of individual driven source pixels which mirrors the driven ground mosaic of pixels directly opposite it. It is also noted that $X_{II}=Y_{JI}$ for each opposing pixel pairs Pixel apportionment can now be converted to a continuous surface shape by the process outlined in FIG. 10C. As can be seen in the figure, pixel apportionment may leave a mosaic of opposing plate sets. The center points of these plates for each surface can be connected to form the wires for a wire frame to define the continuous surface. Typically only one surface may be subject to object pressure and the other may retain the shape of its support structure. The driven ground surface may be thinner and more flexible and therefore may be preferred as the surface in contact with the object.

Surface first order definition may use interpolation and curve fitting techniques to make the wire frame a more complete representation of the actual surface. Second order errors can be corrected using the following techniques:

Mechanical edge constraints and the way the layer/membrane is mounted to the frame can be taken into account. Also, the driven source column leakage from the ends of the columns can also be taken into account. Further, the mechanical stiffness of the membrane/layer in contact with the object can also be taken into account as can the mechanical properties of electric insulation separation space between the column and row surfaces. The non-linear properties of displacement current vs. pixel separation distance can also be taken into account, by a weighting process, to adjust surface shape.

Figure 11A:
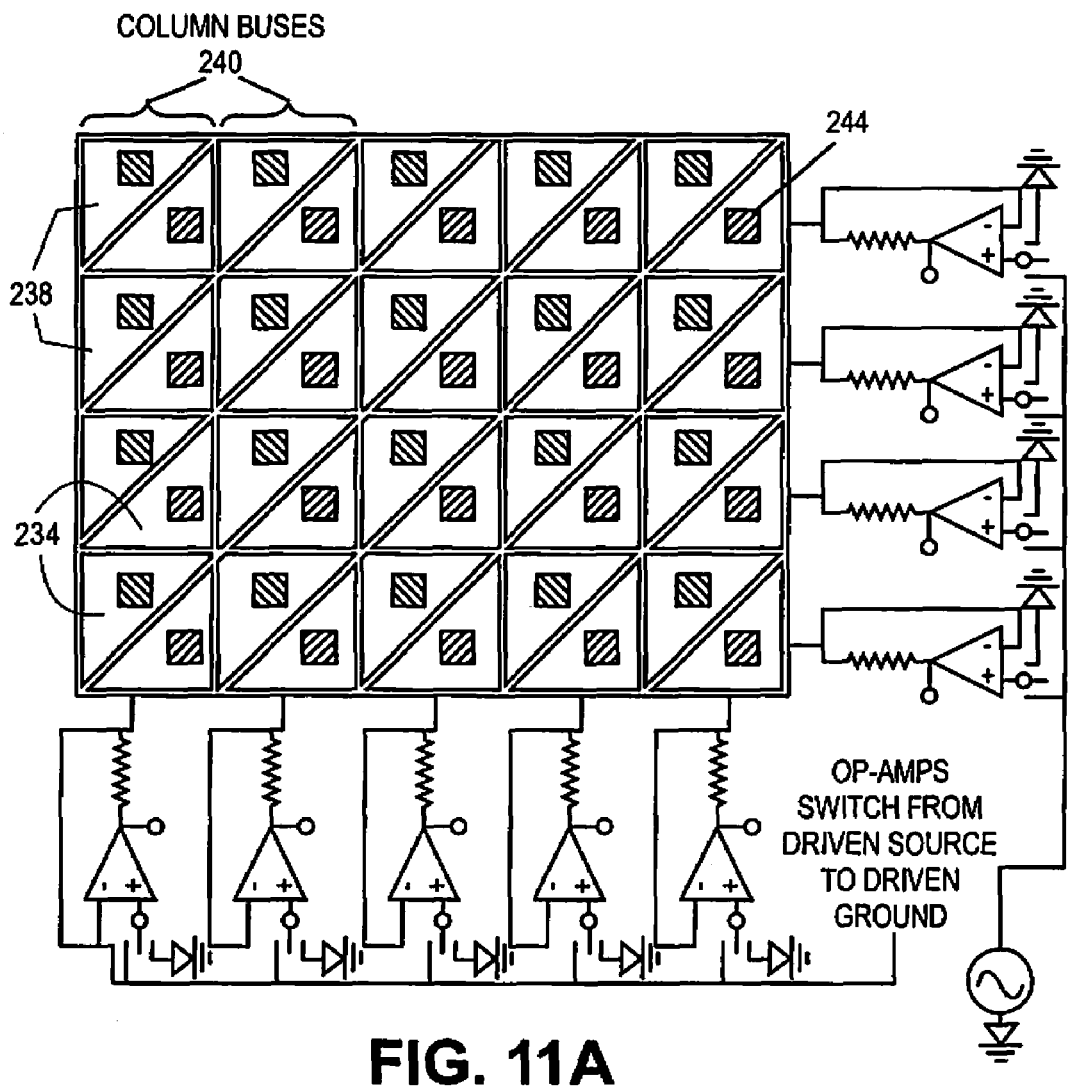
FIG. 11A shows a top schematic view of a multi-technology skin according to an embodiment of the present invention.
Figure 11B:
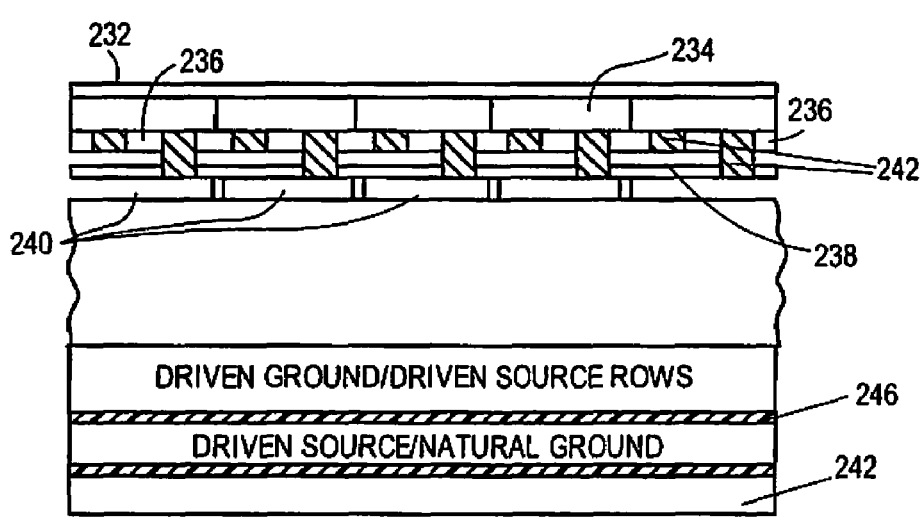
FIG. 11B shows an end section view of the multi-technology skin of FIG. 11A.

FIGS. 11A and 11B, show a top view and an end sectional view, respectively, of a multi-technology skin utilizing one embodiment of the present invention. The multi-technology skin may include a selective switching driven source/driven ground sensing capability for virtual feel pre-contact sensing (including long range collision avoidance), post contact (haptic) sensing capabilities, and the ability to sense the presence of hot objects. The explanation of the multi-technology skin may be addressed in two parts, an electric field portion and, later, with the addition of a temperature sensing capability.

FIGS. 11A and 11B are directed to a basic construction of the multi-technology skin 230. The skin 230 may be constructed in flexible, multi-layer printed circuit board configuration in which the upper-most layer 232 may be a thin film electrical insulator (about 0.005 inches thick) followed by a thin layer of separate, electrically conductive triangular shaped pixels 234 (also about 0.005 inches thick). These pixels may be on top a membrane-film electrical insulator 236 (about 0.005 inches thick) and this insulator 236 is on top of a network of electrical signal row bus lines 238 supplying the column triangular pixels (also about 0.005 inches thick). Column bus lines 240 may be on top of the membrane-film insulation layer 200.

As shown in the figures, there may be through holes 242 in the insulation layers to allow the bus lines to pass beneath each other and to connect to individual pixels as may be required. The total upper multi-layer flexible printed circuit board may be approximately 0.030 inches thick. The lower multi-layer, flexible printed circuit board may be approximately 0.030 inches thick. The lower multi-layer flexible printed circuit board may consist of a bottom electrical conductor 248 (about 0.005 inches thick) with a thin layer of insulation 246 above it (e.g., about 0.005 inches thick). This, in turn, may have a network of driven ground/driven source conductive rows for a total lower multi-layer flexible printed circuit board thickness of about 0.015 inches thick. The upper and lower multi-layer printed circuit boards may sandwich a haptic insulation layer 250 (e.g., about 0.125 inches thick) for a total skin thickness of about 0.170 inches thick. The haptic insulation layer can be made thicker if desired (0.25 or 0.5 inches).

For proximity sensing, the skin electronically configures itself as follows: The triangular pixel columns and rows have their operational amplifier drives configured as driven sources. The rows immediately below the elastic layer may be configured as driven sources and together form a driven shield. The layer below the driven shield column may be configured as a natural ground. The driven source triangular pixels detect, locate and provide a first estimate of the range of a proximal object as per a typical capaciflector array sensor. When the range becomes sufficiently close, the driven ground/driven shield may be switched to a driven ground configuration, as may the column and row, which intersect nearest the estimated center of the object. This intersection may be moved about the estimated location of the object by changing the row and column that are switched to driven ground. When the driven ground column and/or the driven ground row experiences an increase in electric flux, the presence of a dielectric insulator is indicated. This insulator search routine can be alternated with the capaciflector, all driven source configurations, and root motion, to determine the range and size of the object and its conductive/insulator properties.

With this technique, it may be possible to determine, in a manner similar to that described and illustrated in connection with FIGS. 6, 7, and 8A-B, if an insulator film covers a conductor and to estimate the thickness of the insulator. The skin may also perform pre-contact, virtual feel sensing as described and illustrated shown in FIGS. 6, 7, and 8A-B.

Post contact "haptic" sensing will now be discussed in connection with FIGS. 11A and 11B. Upon contact, the skin may electronically reconfigure itself as follows: a) the triangular row and column pixels may become driven ground pixels; b) the driven ground/driven source rows beneath the elastic insulation layer will become driven sources; and c) the driven source/natural ground layer will become a driven source (performing the function of a driven shield).

When an object contacts the skin surface, the contacted pixels push the pixel column buses through the elastic insulation layer and towards the driven source rows. The driven source layer, behind the driven source rows, may perform the driven shield function for the driven source rows. The pixel column buses may be configured as driven ground columns and, in conjunction with the driven source rows, the driven shield layer and the elastic insulation layer in between, constitute a deformation camera which may perform as described above. In this formulation of a deformation camera, making the surface contacting the object a driven ground, rather than a driven source, may isolate its proximity effect from its haptic effect. The shape of the deformation volume and the stiffness of the elastic insulation layer may provide haptic information. Mechanical properties of the remainder of the skin structure contribute to the haptic information.

Figure 12A:
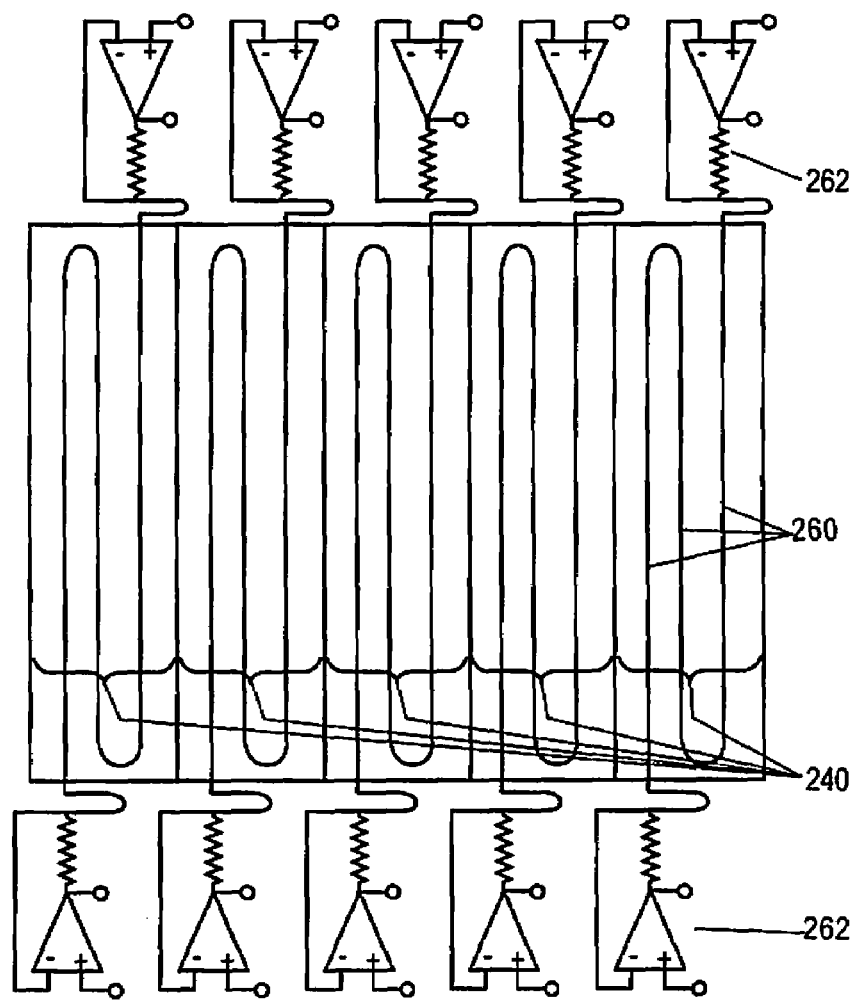
FIG. 12A shows a bottom view and 12B is an end view illustrating a temperature sensing capability in connection with the multi-technology skin according to an embodiment of the present invention.
Figure 12B:
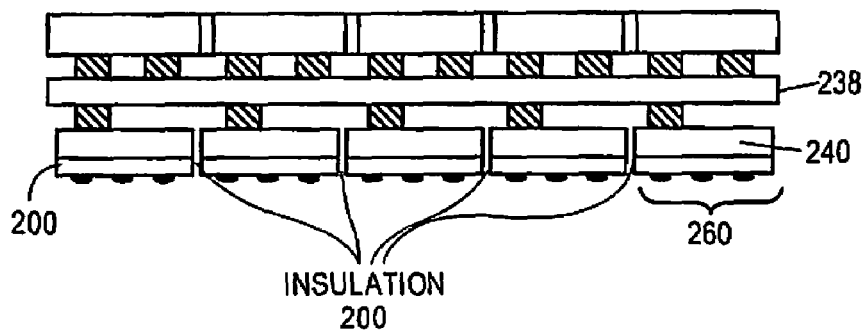
Figure 13A:
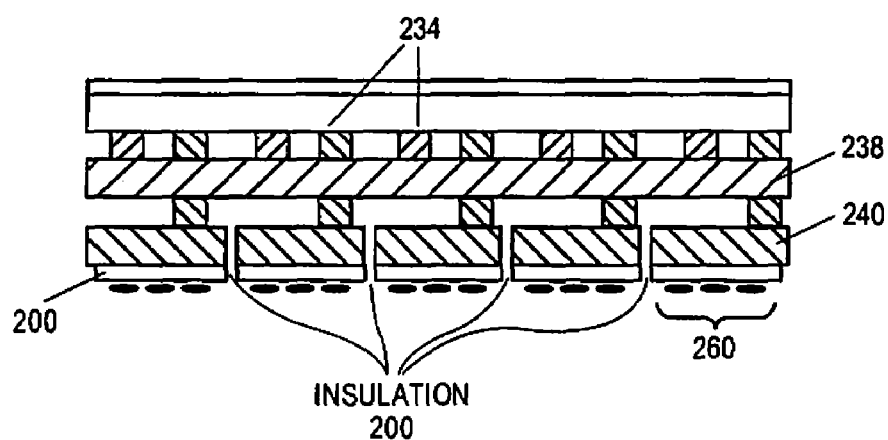
FIG. 13 shows how heat sensing is integrated into post-contact (haptic) sensing functions of the multi-technology sensor according to an embodiment of the present invention.
Figure 13B:
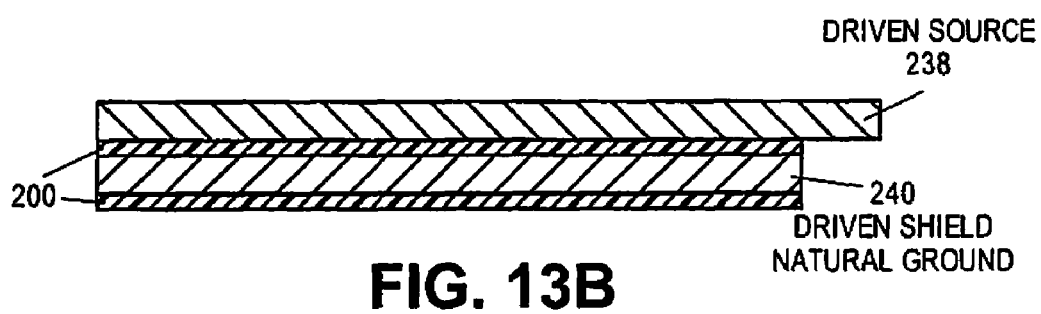

FIGS. 12A, 12B, and 13 show the addition of a temperature sensing capability to the skin 230. FIG. 12A is a bottom up view and FIG. 12B is an end view illustrating the use of strain gauge wires 260 attached to the lower surface of each bus wire carrying current to the columns. FIG. 13 clarifies how heat sensing is integrated into the haptic sensing functions of the multi-technology sensor. The portion of the sensor involving triangular-shaped pixels 234 remains unchanged in construction. The strain gauge wires 260 may be electrically separated from the bus wire as shown in FIGS. 12A, 12B, and 13 and the strain gauge wires may be terminated on each end at 262 by switching current measuring operational amplifiers. The strain gauge wires 260 move with the column buses 240 during haptic sensing conditions and may be protected from stretching and rupture during haptic contact by the column bus structural strength.

When a hot object appears, the column bus structure may expand thermally with respect to the strain gauge wires (they have different temperature expansion coefficients) and temperature strain may be measured. Strain gauge measurements need only be done on columns because information on object location may be separately measured by virtual feel pixels and/or haptic pixels. The strain gauges may measure using one switching current measuring operational amplifier connecting to the oscillator and the other switching current-measuring operational amplifier configured as a driven ground. Strain gauge wire resistance may be measured by the current passing through the termination operational amplifiers. The strain gauge termination operational amplifiers can be switched open (left with floating ground) during haptic measurements so they may not affect theses measurements. The same may pertain to proximity measurements.

FIGS. 14A, 14B, 15A, 15B, 15C, 16A, 16B, and 16C are directed to a material identification sensor in accordance with the embodiments of the present invention. The material identification sensor will be capable of identifying the type of material an object may be made of when pressed up against that object.

Figure 14A:
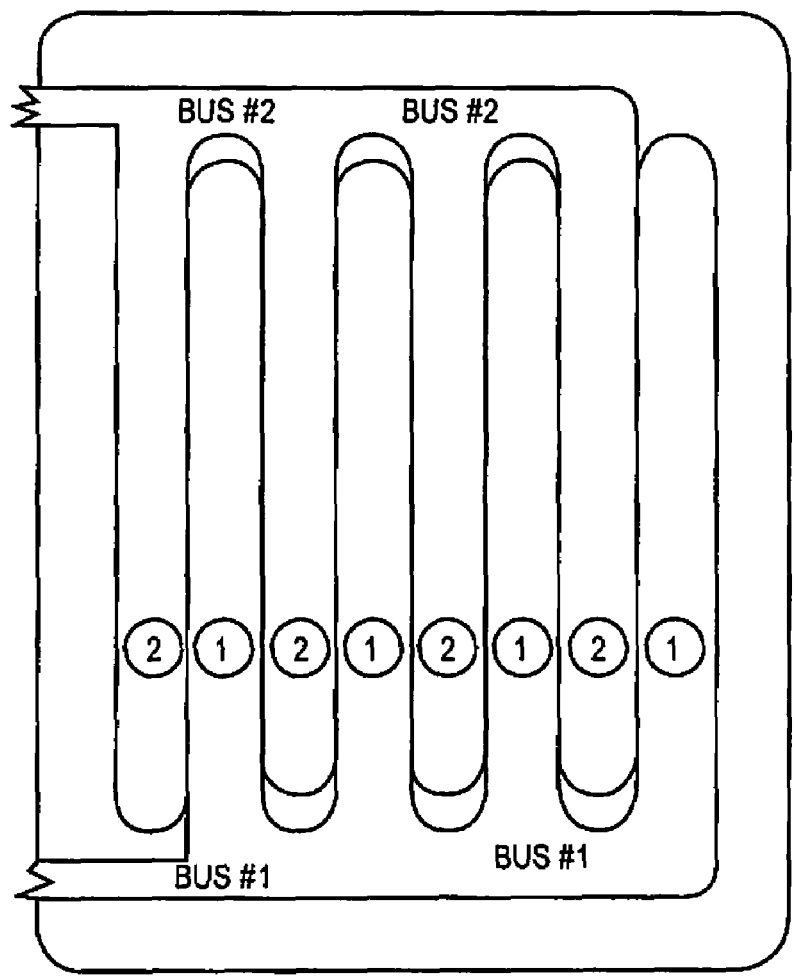
FIG. 14A shows a top view of a material identification sensor according to an embodiment of the present invention.
Figure 14B:
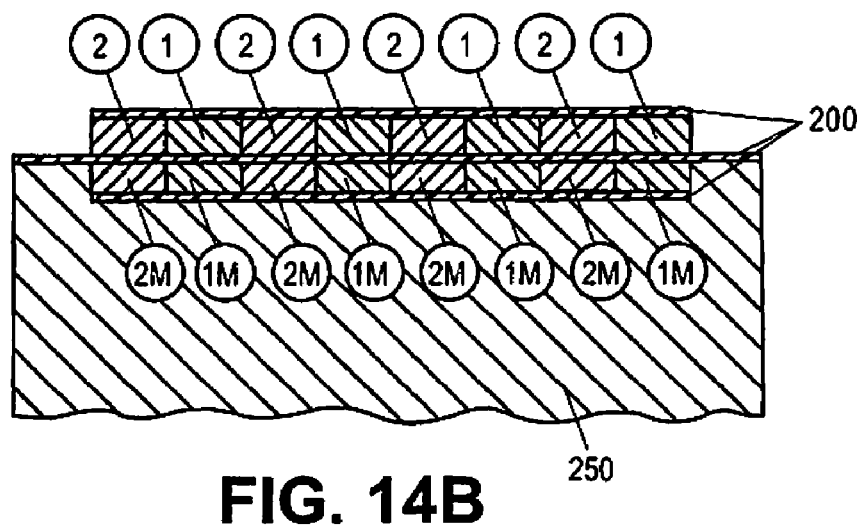
FIG. 14B shows a side section view of the sensor of FIG. 14A.

The material identification sensor may be constructed as a thin, multi-layer, flexible printed circuit board set of two each pairs of state-switching driven source 140/driven ground 110 capacitive sensors. The two pairs may be located with one directly above the other and separated by a thin film insulator 200 isolating the two pairs from interfering with each other. The two material identification sensors of each sensor pair may have interlocking sensing fingers as shown in FIG. 14A. The sensor pairs may be mounted directly above each other (FIG. 14B) such that the electric field actions of the lower pair mirror the electric field actions of the upper. This provides active shielding and improved S/N performance for the upper sensor pair.

The thin, multi-layer, flexible printed circuit board sensor head may be mounted to an elastic insulation layer 250 such that when the sensor may be pressed against an object, the sensor head may conform to the shape of the object. The sensor system may be capable of determining whether the object is an electric insulator, an electric conductor, or an electric conductor with a layer of insulation over it. If the material is determined to be an insulator, the sensor may measure its relative dielectric constant at sensor frequency. If the material is a conductor, the sensor may determine this, but will likely be unable to discriminate its exact conductivity beyond establishing it to be very conductive. If the material is an insulator film over a conductor, the sensor may determine this to be the case, to determine the insulator film thickness and to determine its relative dielectric constant.

Figure 15A:
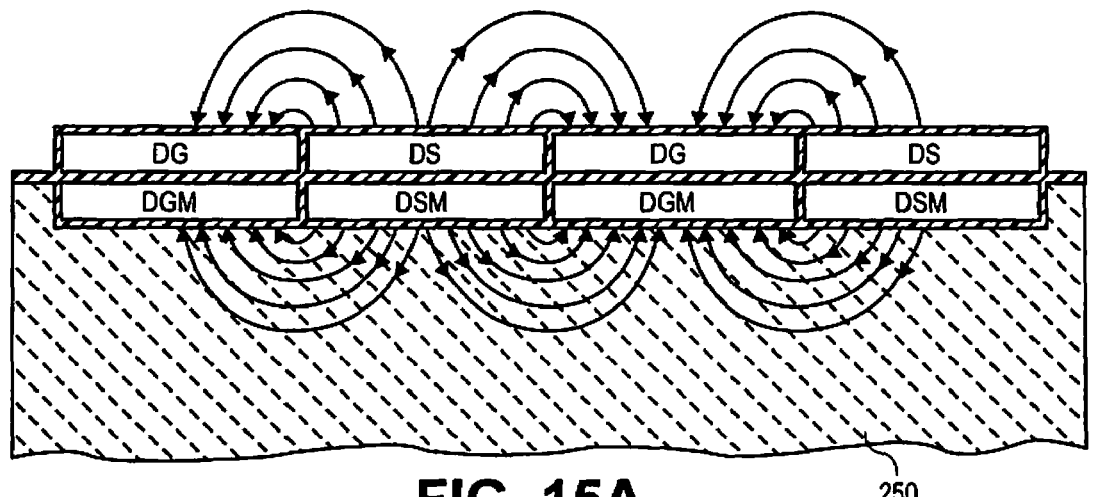
FIGS. 15A, 15B, and 15C show material identification conditions according to an embodiment of the present invention.
Figure 15B:
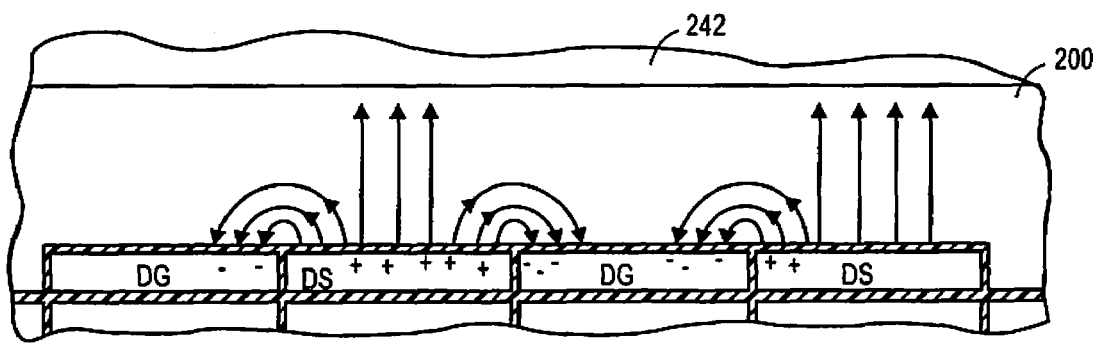
Figure 15C:
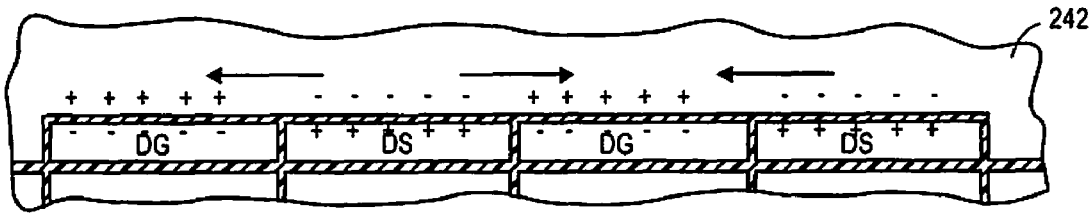
Figure 16A:
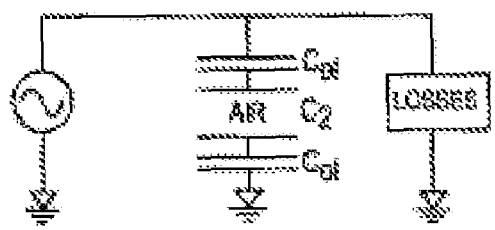
FIGS. 16A, 16B, and 16C show side section views illustrating the equivalent circuits that attend each of the calibration conditions of FIGS. 15A, 15B, and 15C, respectively.
Figure 16B:
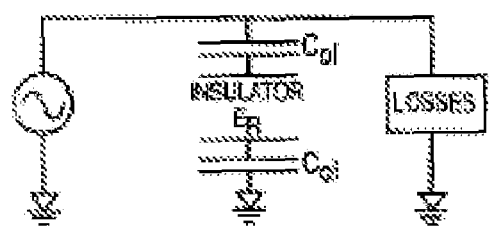
Figure 16C:
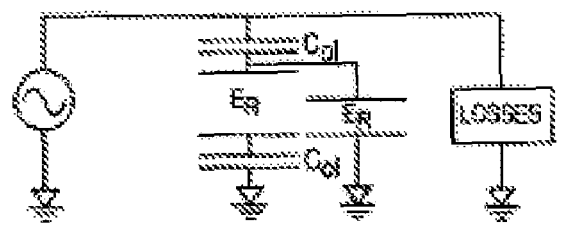

FIGS. 15A through 15C illustrate material identification conditions according to embodiments of the present invention. FIGS. 16A through 16C illustrate the equivalent circuits that attend each of the conditions.

Referring now to FIGS. 15A through 15C, calibration may be performed before the sensor encounters an object. In the calibration condition, two pairs of mirrored sensors may operate with identical oscillator inputs such that one pair has electric fields looking outwards towards the object (with air or vacuum as its dielectric) and the other (mirror) pair has electric fields looking inwards through the elastic insulator layer with the dielectric constant being that of the elastic insulation material. For both sensor pairs, the interlocking fingers may form plates of a capacitor where the plates are side by side, rather than one in front of the other, and the electric fields and displacement current arc across from one plate to the other.

FIG. 16A shows the equivalent circuit for the sensor pair looking outwards into air or vacuum and FIG. 16B shows the equivalent circuit for the sensor pair looking back through the dielectric constant of the elastic insulation layer, which can be analyzed based on the following equations.

$$V = \frac{I}{J\omega C}; J\omega C = I \quad (16)$$

$$\frac{J\omega C_M}{J\omega C_C} = \frac{I_M}{I_C} \quad (17)$$

$$\frac{I_{DGM}}{I_{DGV}} = \frac{\varepsilon_{RM}}{\varepsilon_{RC}} \quad (18)$$

Since $\varepsilon_{RC}=1$ for air or vacuum, we have determined $\varepsilon_{RM}$
Where:
$I_{DS}$=Current from driven source (vector quantity)
$I_{DG}$=Current passing through driven ground (vector quantity)
$I_{DSM}$=Current from driven source mirror (vector quantity)
$I_{DGM}$=Current passing through driven ground mirror (vector quantity)
$\varepsilon_{RM}$=Relative dielectric constant of elastic insulation layer
$\varepsilon_{RX}$=Relative dielectric constant of unknown material With regard to sensing insulators, when insulators are being measured with no interference from neighboring conductors, a situation occurs similar to that in the calibration conditions, (Equations (16), (17), (18) above), except the unknown insulation material may be measured has a relative dielectric constant $\varepsilon_R$ different from air and different from the mirror elastic insulator material. So, the unknown $\varepsilon_{RX}$ can be calculated by:

$$\frac{I_{DGM}}{I_{DGX}} = \frac{\varepsilon_{RM}}{\varepsilon_{RX}} \quad (19)$$

The case of sensing conductors will now be examined. When $$I_{DS} \gg I_{DSM}, I_{DG} \gg I_{DGM} \text{ and } \sum I_{DS} \approx \sum I_{DM} \quad (20)$$

Determining the coefficient of conductivity precisely may be difficult because the length of the conductive path being measured may be too short to provide a useful voltage drop due to resistance.

The case of sensing mixed conditions where a conductor may be covered by a dielectric layer is addressed in the following.

$$\Sigma I_{DS} - \Sigma I_{DG} = \Sigma I_{DC} \quad (21)$$

Thus, the relative amounts of electrical current that goes to the driven ground relative to that which goes to the natural ground across the gap may be determined. From FIGS. 15A through 15C, it can be seen that the electric flux density distribution from driven source to neighboring driven ground may be hemispherical in shape, may be most dense nearest the separation between adjoining electrodes, driven source and driven ground, and may increasingly decreases further from the separation.

FIG. 15A illustrates the full pattern with no natural ground interference. The pattern in air and the same pattern, but more dense, is shown in the elastic insulator mirror directly below. FIG. 15B shows the situation where a natural ground diverts some of the electrical flux away. This may happen at the point where the length of the electric field path along its outermost semi circle may be equal to the gap length from driven source to natural ground. The electrical field strength in this instance may be the same going either way. With the gap known, the sensor can be switched to driven source configuration and the displacement current measured again, with all the displacement current may be going into the natural ground. In this instance, capacitance may be effectively measured, and knowing $\varepsilon_O$, A, D(gap), $\varepsilon_R$ can be determined (as per equation (22) below).

$$C = \frac{\varepsilon_R \varepsilon_O A}{D(\text{gap})} \quad (22)$$

Figure 17A:
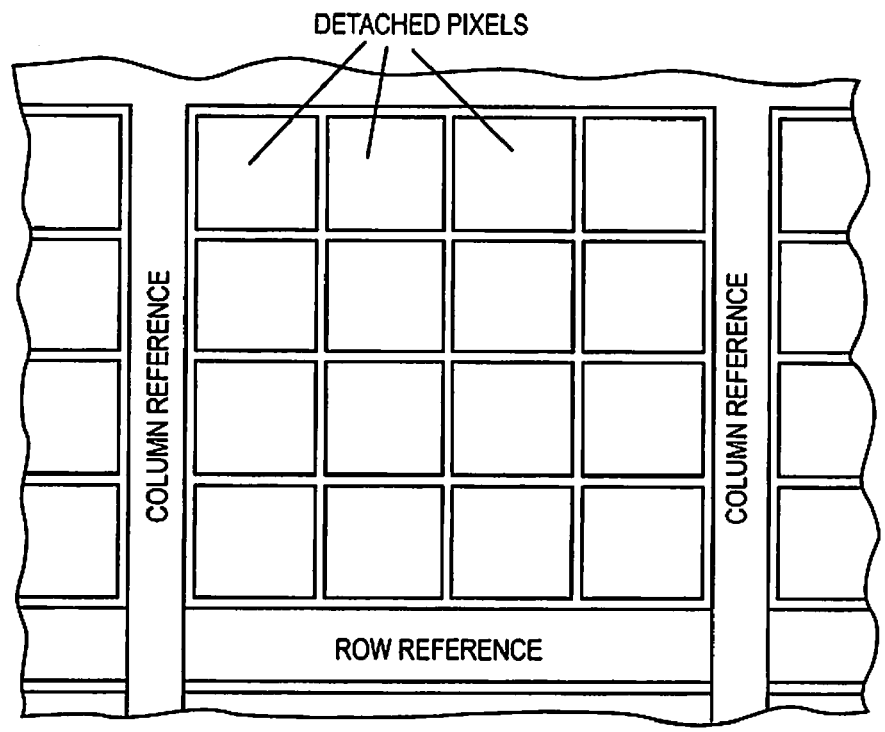
FIG. 17A shows a top view and FIG. 17B is an end view illustrating how a displaced pixel skin works as a system according to an embodiment of the present invention.
Figure 17B:
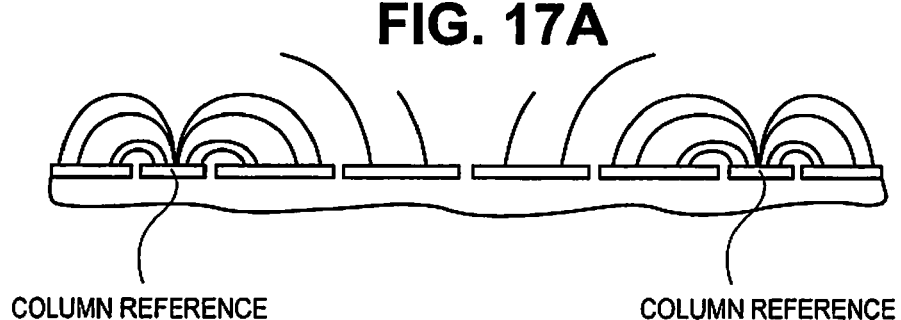

FIGS. 17A, 17B, 18A, and 18B illustrate a detached pixel skin, which is a modified version to the skin described above. FIG. 17A is a top view and FIG. 17B is an end view illustrating how the displaced pixel skin works as a system. The pixels may work in a capaciflector mode in which the pixels can scan and sense as columns or as rows on command. The column and row reference strips can be configured as either a driven ground or as a driven capaciflector shield. Shown in FIG. 17B, converting one or more column reference strips as a driven ground column and configuring the neighboring pixels as columns, sets up electric fields capable of discriminating insulators and insulation films and layers. The same process can be used to work with rows.

Figure 18A:
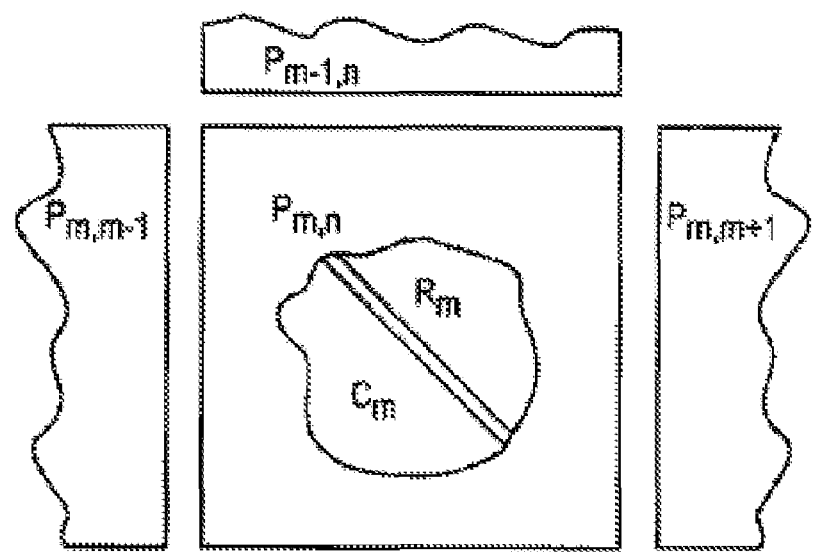
FIG. 18A shows a top view of a displaced pixel and FIG. 18B provides detail on how displaced pixels function according to an embodiment of the present invention.
Figure 18B:
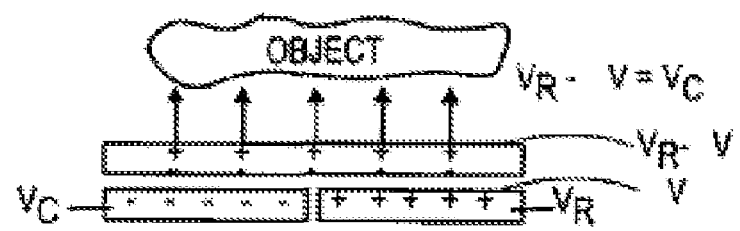

FIG. 18A is a top view of a displaced pixel and FIG. 18B provides detail on how displaced pixels work. From FIG. 18A, the surface of the skin appears as mosaic of individual pixels (square in this example). Looking through an individual pixel, it can be seen as covering a triangular row electrode and a triangular column electrode. These electrodes may work as shown and described in connection with the multi-technology skin of FIG. 11 above.

With the multi-technology skin performing in the proximity sensing mode, the column and row triangles may sense as electrodes. When a set of triangles (one belonging to a row and one belonging to a column) is covered by a rectangular pixel displaced slightly from the electrode surfaces to prevent shorting, the signals from the electrodes can capacitively coupled through the common displaced pixel to an object ground. If a slight voltage imbalance may be created between the electrodes, the dominant electrode may take possession of the displaced pixel and that pixel may be capacitively coupled to the object. This imbalance can also be set so that there is no coupling between the triangular electrodes. With this technique, the pixels can perform as a set of n columns or as a set of m rows. This technique may serve to nearly double the effective area of each triangular electrode. For example, if it is assumed that the pixel displacement is 0.010 inches and the object is 1 inch away from the pixel, the displacement capacitance C can be calculated as $$C = \frac{\varepsilon A 100}{2D} = \frac{50\varepsilon A}{D} = 50C.$$

The pixel capacitance of object is:

$$\frac{\varepsilon A}{D} = C$$

Together they constitute a capacitance of:

$$\frac{50C(C)}{50C+C} = \frac{50}{51}C \approx C$$

Accordingly, driven ground sensing in combination with capaciflector sensing and natural ground and with the capability to switch to any of the three states in real time, may be much more effective than only capaciflector sensing in many respects. This hybrid technology can discriminate dielectrics from conductors and can provide precision guidance for robot tools in all expected space/industry working environments. It may also provide added safety and performance as a result.

Basic capacitive technology measuring dielectric materials, such as glass, have limitations that may be overcome using switching capaciflector driven sources in conjunction with driven and natural grounds. Amplified driven ground arrays may be more effective and precise than a single driven source electrode. They may be also simpler and less expensive.

For precision alignment of components and subsystems in scientific instruments, driven ground terminations, taken in conjunction with driven sources may provide a more precise measurement than using capacitive (or capaciflector) technology by measuring losses and leakage and by amplifying the measurement of displacement current passing through the object.

Capacitive array sensors and skins may have advantages for both robotics and prosthetics because they are rugged compact and flexible and because they may sense the presence of humans and conductors so well. Capaciflector arrays and skins may have better S/N than typical capacitive designs and have been successfully used. By incorporating a driven ground capability, sensitivity can be improved and dielectrics can be discriminated from conductors so their use as a collision avoidance safety system may greatly improve. This holds true for both capaciflector and capacitive-based arrays. Driven ground capabilities may also improve the haptic capabilities of skins. Multi-technology skins may have synergistically reinforcing technologies and capabilities in a simple, rugged and practical package.

Although a few embodiments of the present invention have been shown and described, it may be appreciated by those skilled in the art that changes may be made in these embodiments without departing from the principles and spirit of the invention. Other embodiments of the invention may be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A sensing electrical circuit system embodied in a deformation camera sensor, said system comprising:
    an electric potential source;
    an impedance load; and
    a driven ground comprising a resistor and an operational amplifier, said electric potential source driving a current through said impedance load to said driven ground, and a voltage source exciting a minus terminal of the operational amplifier reactively generating an equal and opposite voltage driving a net potential to approximately zero; wherein
    said sensing electrical circuit system is embedded in a flexible skin, wherein deformation of said flexible skin changes said current through said impedance load to said driven ground.

2. The system of claim 1, further comprising:
    a driven source interposed between an electric potential source and said impedance load;
    said driven source comprising a resistor and an operational amplifier; and
    said driven source generating a voltage vector source which enables measuring amplitude, phase, and frequency.

3. A sensing electrical circuit system embodied in a tool, said system comprising:
    an electric potential source;
    an impedance load; and
    a driven ground comprising a resistor and an operational amplifier, said electric potential source driving a current through said impedance load to said driven ground, and a voltage source exciting a minus terminal of the operational amplifier reactively generating an equal and opposite voltage driving a net potential to approximately zero wherein said tool is a deformation camera sensor, said deformation camera sensor comprising a compressed flexible multi-layer sheet including layers of:
    a first natural ground layer;
    a driven shield layer;
    a plurality of driven source columns;
    a separation layer;
    a plurality of driven ground rows;
    a thin insulation layer; and
    a second natural ground layer;
    wherein deformation of said first natural ground layer correspondingly deforms the separation layer and increases a corresponding proximity of the plurality of driven source columns to the plurality of driven ground rows, thereby increasing displacement current between the plurality of driven source columns and the plurality of driven ground rows, and thereby generating a displacement current identifying a location of three dimensional displacement.

4. The system of claim 3, wherein the separation layer is an elastic insulator layer.

5. The system of claim 3, wherein displacement current is measured for each row and for each column and then related to measure their mutually simultaneous values.

6. The system of claim 3, wherein displacement current passing between columns and rows is apportioned on a pixel by pixel basis.

* * * * *